United States Patent
Markman et al.

(10) Patent No.: US 7,492,818 B2
(45) Date of Patent: Feb. 17, 2009

(54) EQUALIZER MODE SWITCH

(75) Inventors: Ivonete Markman, Carmel, IN (US);
Jeongsoon Park, Lafayette, IN (US);
Seo Weon Heo, Seoul (KR); Saul Brian Gelfand, Lafayette, IN (US)

(73) Assignee: Thomson Licensing, Boulogne Billancourt (FR)

(*) Notice: Subject to any disclaimer, the term of this patent is extended or adjusted under 35 U.S.C. 154(b) by 697 days.

(21) Appl. No.: 10/511,648

(22) PCT Filed: Apr. 11, 2003

(86) PCT No.: PCT/US03/11028

§ 371 (c)(1),
(2), (4) Date: Oct. 18, 2004

(87) PCT Pub. No.: WO03/090350

PCT Pub. Date: Oct. 30, 2003

(65) Prior Publication Data

US 2005/0254568 A1 Nov. 17, 2005

Related U.S. Application Data

(60) Provisional application No. 60/373,204, filed on Apr. 17, 2002.

(51) Int. Cl.
H03H 7/40 (2006.01)

(52) U.S. Cl. ...................... 375/233; 708/323

(58) Field of Classification Search ......... 375/229–234, 375/350; 708/322, 323
See application file for complete search history.

(56) References Cited

U.S. PATENT DOCUMENTS

| 5,311,546 | A | * | 5/1994 | Paik et al. .................. 375/232 |
| 5,524,023 | A | | 6/1996 | Tsujimoto |
| 5,809,074 | A | * | 9/1998 | Werner et al. ............... 375/233 |
| 6,075,816 | A | | 6/2000 | Werner et al. |
| 6,671,339 | B1 | * | 12/2003 | Ahn .......................... 375/346 |

OTHER PUBLICATIONS

Search Report Dated Jul. 17, 2003.

* cited by examiner

*Primary Examiner*—Dac V Ha
(74) *Attorney, Agent, or Firm*—Joseph J. Laks; Paul P. Kiel

(57) ABSTRACT

An apparatus for automatically selecting one of a standard decision directed mode and a soft dd mode in a decision feedback equalizer for receiving a data signal comprises an equalizer for providing a DFE output signal and having a control input responsive to a control signal exhibiting a first value for selecting the standard dd mode and a second value for selecting the soft dd mode. The equalizer includes a lock detector having an output for providing a lock signal indicative of equalizer convergence. The apparatus includes a mode selector having an input coupled to the lock detector output and having an output coupled to the control input for providing an output signal exhibiting one of the first and second values depending upon characteristics of the lock signal.

29 Claims, 4 Drawing Sheets

EQUALIZER MODE SWITCH

CROSS-REFERENCE TO RELATED APPLICATIONS

This application claims the benefit, under 35 U.S.C. §365 of International Application PCT/US03/11028, filed Apr. 11, 2003, which was published in accordance with PCT Article 21(2) on Oct. 30, 2003 in English and which claims the benefit of U.S. Provisional Patent Application No. 60/373,204, filed Apr. 17, 2002.

BACKGROUND OF THE INVENTION

The present invention relates generally to adaptive equalizers, which may be used to compensate for signal transmission by way of a channel having unknown and/or time-varying characteristics such as may occur in high definition television reception and, more particularly, relates to an equalizer/forward error correction (FEC) automatic mode selector.

In the Advanced Television Systems Committee (ATSC) standard for High Definition Television (HDTV) in the United States, the equalizer is an adaptive filter which receives a data stream transmitted by vestigial sideband modulation (VSB), VSB being the modulation system in accordance with the ATSC-HDTV standard, at an average rate equal to the symbol rate of approximately 10.76 MHz. The equalizer attempts to remove or reduce linear distortions mainly caused by multipath propagation, which are a typical characteristic of the terrestrial broadcast channel. See United States Advanced Television Systems Committee, "ATSC Digital Television Standard," Sep. 16, 1995.

Decision Feedback Equalizers (DFE's) as used in the communications art generally include a feedforward filter (FFF) and a feedback filter (FBF), wherein typically the FBF is driven by decisions on the output of the signal detector, and the filter coefficients can be adjusted to adapt to the desired characteristics to reduce the undesired distortion effects. Adaptation may typically take place by transmission of a "training sequence" during a synchronization interval in the signal or it may be by a "blind algorithm" using property restoral techniques of the transmitted signal. Typically, the equalizer has a certain number of taps in each of its filters, depending on such factors as the multipath delay spread to be equalized, and where the tap spacings "T" are generally, but not always, at the symbol rate. An important parameter of such filters is the convergence rate, which may be defined as the number of iterations required for convergence to an optimum setting of the equalizer. For a more detailed analysis and discussion of such equalizers, algorithms used, and their application to communications work, reference is made to the technical literature and to text-books such as, for example, "Digital Communications", by John G. Proakis, $2^{nd}$ edition, McGraw-Hill, New York, 1989; "Wireless Communications" by Theodore S. Rappaport, Prentice Hall PTR, Saddle River, N.J., 1996; and "Principles of Data Transmission" by A. P. Clark, $2^{nd}$ edition, John Wiley & Sons, New York, 1983.

BRIEF SUMMARY OF THE INVENTION

In accordance with an aspect of the invention, apparatus for automatically selecting one of a standard decision directed (dd) mode and a soft dd mode in a decision feedback equalizer (DFE) for a data signal comprises an equalizer for providing a DFE output signal and having a control input responsive to a control signal exhibiting a first value for selecting the standard dd mode and a second value for selecting the soft dd mode. The equalizer includes a lock detector having an output for providing a lock signal indicative of equalizer convergence. The apparatus includes a mode selector having an input coupled to the lock detector output and having an output coupled to the control input for providing an output signal exhibiting one of the first and second values depending upon characteristics of the lock signal.

In accordance with another aspect of the invention, apparatus for automatically selecting one of a standard decision directed dd mode and a soft dd mode in a decision feedback equalizer (DFE) for receiving a data signal, comprises an equalizer having an output for providing a DFE output signal and having a control input responsive to a control signal exhibiting (a) a first value for selecting the standard dd mode and (b) a second value for selecting the soft dd mode; the equalizer including a lock detector having an output for providing a lock signal indicative of equalizer convergence; and a mode selector having an input coupled to the lock detector output and having an output coupled to the control input for providing a control signal exhibiting one of the first and second values depending upon characteristics of the lock signal.

In accordance with another aspect of the invention, a mode selector includes a processor having: an input coupled to the mode selector input for counting the number of transitions of the lock signal between the first and second values during a defined interval; a comparator for comparing the number of transitions against a defined threshold count; and a comparator output providing a first signal exhibiting the first value when the number of transitions is less than the threshold count and exhibiting the second value when the number of transitions is not less than the threshold count, the comparator output being coupled to the mode selector output.

In accordance with another aspect of the invention, apparatus for automatic selection of one of a standard automatic switching mode and a soft automatic switching mode in a decision feedback equalizer (DFE) for receiving a data signal, wherein the automatic switching mode comprises one of: (a) a blind mode, and (b) a decision directed mode, and the soft automatic switching mode comprises: (a) a blind mode, and (b) a soft decision directed mode; the equalizer having a control input for mode selection responsive to a signal exhibiting: (a) a first value for selecting the standard automatic switching mode, and (b) a second value for selecting the soft automatic switching mode, and including a lock detector for providing a lock signal having first and second lock signal values respectively indicative of equalizer convergence and non-convergence; and apparatus for providing a selection signal to the control input for mode selection, the apparatus: monitoring the rate of transitions of the lock signal between the first and second lock signal values and providing a control signal; comparing the rate of transitions with a threshold rate of transitions and causing the control signal to exhibit a first control value when the rate of transitions is less than the threshold rate and to exhibit the second value when the rate of transitions is not less than the threshold rate; when the equalizer is in the standard automatic switching mode, monitoring the rate of occurrences of the control signal having the first control value and comparing the rate with a threshold rate of occurrence and if the rate of occurrences is less than the threshold rate of occurrence then causing the selection signal to exhibit the second value for selecting the soft automatic switching mode; otherwise, when the rate of occurrences is not less than the threshold rate of occurrence, the standard automatic switching mode remains selected, and when the equalizer is in the soft automatic switching mode, monitoring the rate of occurrences of the control signal having the first control value and comparing the rate with the threshold rate of occurrence and if the rate of occurrences is not less than the threshold rate of occurrence then causing the selection signal to exhibit the first value for selecting the standard automatic switching mode, and otherwise, when the rate of occurrences is less than the threshold rate, the soft automatic switching mode remains selected.

BRIEF DESCRIPTION OF THE SEVERAL VIEWS OF THE DRAWINGS

The invention will be more fully understood from the detailed description which follows, in conjunction with the drawings, in which.

DETAILED DESCRIPTION OF THE INVENTION

An equalizer automatic mode switch in accordance with the present invention comprises a T-spaced (where T is the symbol period) DFE (Decision Feedback) equalizer with three available modes: training, blind and decision directed.

Figure 1:
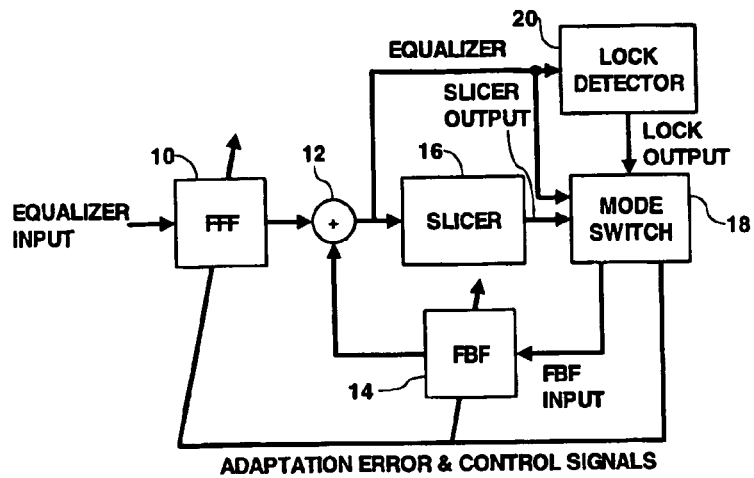
FIG. 1 shows a schematic block diagram of a decision feedback equalizer (DFE) architecture.

Before entering into a detailed description of preferred embodiments of the present invention, it will be helpful to a better understanding of the principles of the present invention and to defining certain terms to consider first a somewhat simplified block diagram of a Decision Feedback Equalizer (DFE) architecture as shown in FIG. 1.

The input to the DFE is coupled to a Feed-Forward Filter (FFF) 10 whose output is coupled to a summation unit 12, the other input to summation unit 12 being coupled to the output of a Feed-Back Filter (FBF) 14. The output of summation unit 12 is coupled to a slicer 16, to an input of a mode switch 18, and to a lock detector 20. The output of lock detector 20 is coupled to a control input of mode switch 18. The output of slicer 16 is coupled to another input of mode switch 18 and an output of mode switch 18 is coupled to an input of FBF 14. Another output of mode switch 18 is coupled to coefficient control inputs of FFF 10 and FBF 14.

The functions of the FFF 10, FBF 14 and slicer 16 are well known and constitute the basic functions of filtering and quantization, respectively. See, for example, the afore-cited text by Proakis. Additional information on filters and their implementation can be found in various textbooks such as, for example, "Digital Signal Processing," by John G. Proakis and Dimitris G. Manolakis, Prentice Hall, New Jersey; 1996 and "Introduction to Digital Signal Processing," by Roman Kuc, McGraw-Hill Book Company, New York; 1988. Lock detector 20 is responsible for the equalizer convergence detection function. It updates the lock detector output by comparing the equalizer output against the slicer levels with a threshold. If the equalizer output and slicer levels are within the threshold distance, a lock or convergence is detected. Mode switch 18 selects the input to the FBF filter as well as the error and control signals to be used in the equalizer adaptation, according to the equalizer mode of choice. It also checks the lock detector output. In normal operation, mode switch 18 has an automatic switching capability, which depends on the output of equalizer lock detector 20. Mode switch 18 interprets the training and blind modes as being used for convergence purposes only. After the equalizer lock detector detects convergence, the equalizer is then transitioned to the decision directed mode. If convergence is lost, the equalizer goes back to training or blind mode.

In the Advanced Television Systems Committee (ATSC) standard, a training sequence was included in the field sync to allow for initial equalizer convergence. In training mode, the equalizer coefficients are only updated during the field sync. However, two main drawbacks associated with its use are that it requires prior correct detection of the field sync and that the training sequence is contained in the field sync, which only occurs approximately every 25 milliseconds (ms), possibly resulting in slow convergence.

For ghost environments that make it difficult to detect a field sync or with a dynamic component, it is of interest to have an initial adjustment of the equalizer tap coefficients independent of a training sequence, that is, self-recovering or blind. See, for example the above cited text by Proakis and the paper by D. N. Godard, "Self-Recovering Equalization and Carrier Tracking in Two Dimensional Data Communication Systems" IEEE Trans. on Commun., Vol. COM-28, pp. 1867-1875, November 1980.

Furthermore, because it works on every data symbol, the blind algorithm will have a faster convergence.

As is typically the case in the conventional dd mode, the input to FBF 14 is the output of slicer 16. Thus, in the dd mode, the adaptation error and the input to the feedback filter are aided by the presence of a slicer, and coefficient adaptation takes place throughout the data sequence. This mode does not have good convergence capabilities, but after convergence, it has advantages over the other two modes. The advantage of dd mode with respect to blind mode is attributable to the presence of the slicer, resulting in better MSE (mean squared error) and BER (bit error rate) performance at the equalizer output. With respect to the training mode, the fact that dd updates its tap on every symbol, as opposed to training symbols only, allows for faster adaptation and tracking capabilities.

It is herein recognized that the use of blind and dd modes as an aid or as alternative approaches to the training mode are desirable because, inter alia, the training mode in the ATSC-HDTV standard has a slow convergence, as well as poor dynamic tracking capabilities.

In what follows, reference is made to an HDTV receiver and to some of its components and it may be helpful to briefly mention their context. In such a receiver, the adaptive channel equalizer is typically followed by a phase tracking network for removing phase and gain noise from which the signal goes to a trellis decoder followed by a data de-interleaver. The signal is then Reed-Solomon error corrected and then descrambled after which it undergoes audio, video, and display processing. Further details may be found in the technical literature such as, for example, the handbook "Digital Television Fundamentals", by Michael Robin and Michel Poulin, McGraw-Hill, New York; second edition, 2000.

Figure 2:
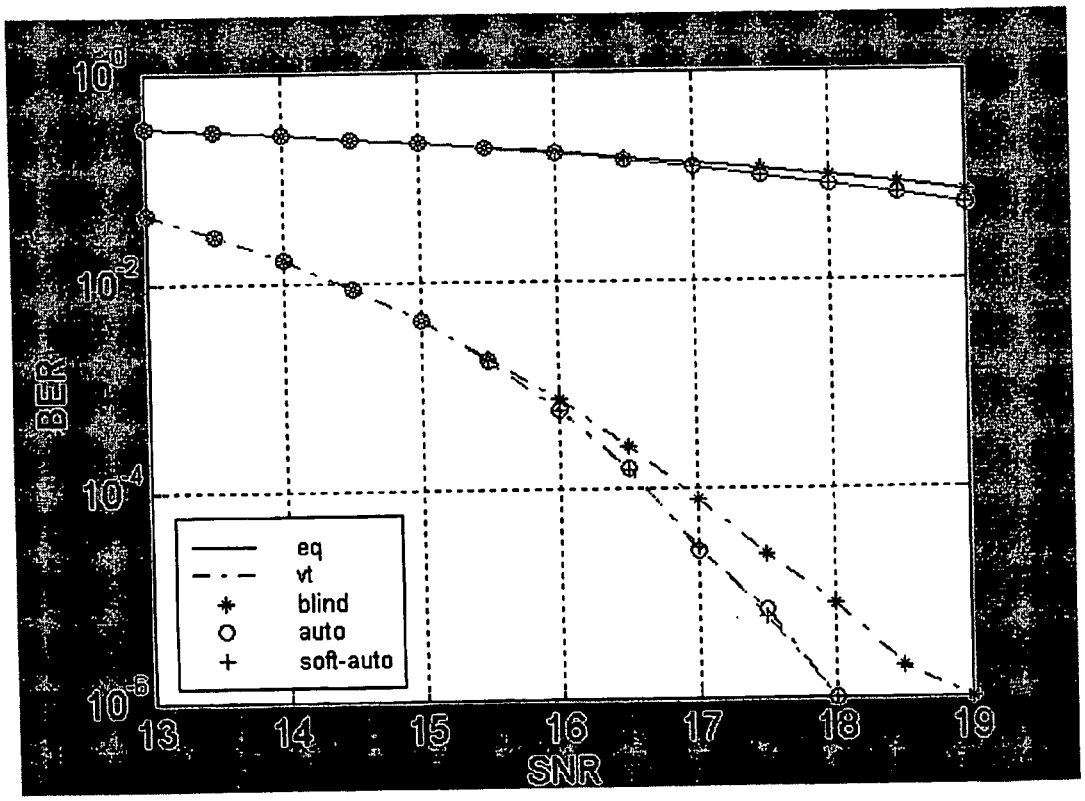
FIG. 2 shows bit error rate (BER) versus signal to noise ratio (SNR) in dB for an equalizer and Viterbi decoder in the additive white Gaussian noise (AWGN) channel.

FIG. 2 shows a graph of BER (Bit Error Rate) vs. SNR (Signal-to-Noise Ratio) performance curves for the equalizer and Viterbi decoder of an HDTV receiver in the AWGN (Additive White Gaussian Noise) channel. The performance is measured after the equalizer as well as after the Viterbi decoder (VD). The Viterbi decoder follows the equalizer in the receiver design and decodes the first level of FEC (Forward Error Correction), corresponding to a TCM (Trellis Coded Modulation) code.

In FIG. 2, three curves are shown for the equalizer (upper set of curves) as well as VD output (lower set of curves): one for the equalizer in blind mode only, the second for the equalizer in automatic switching mode and the third for the equalizer in soft automatic switching mode. In automatic switching mode, the equalizer is in blind mode prior to convergence, and switches to dd mode after convergence is detected. If convergence is lost, it switches back to blind mode. Soft automatic switching mode is similar to automatic switching mode, except that the dd mode is a soft dd mode. In soft dd mode, the input to the feedback filter is the output of the equalizer, instead of the slicer output.

In view of the characteristics shown in FIG. 2, the following are herein recognized:
  a. The equalizer output performance under automatic mode is equal to or better than under blind mode. For increasing SNR, the automatic switching performance is increasingly better;
  b. The VD output performance reflects the equalizer output performance. Under automatic switching mode, it is equal or better than under blind mode. For increasing SNR, the automatic switching performance is increasingly better.
  c. The automatic switching and soft automatic switching modes present similar performance both at the equalizer output and VD output.

Figure 3:
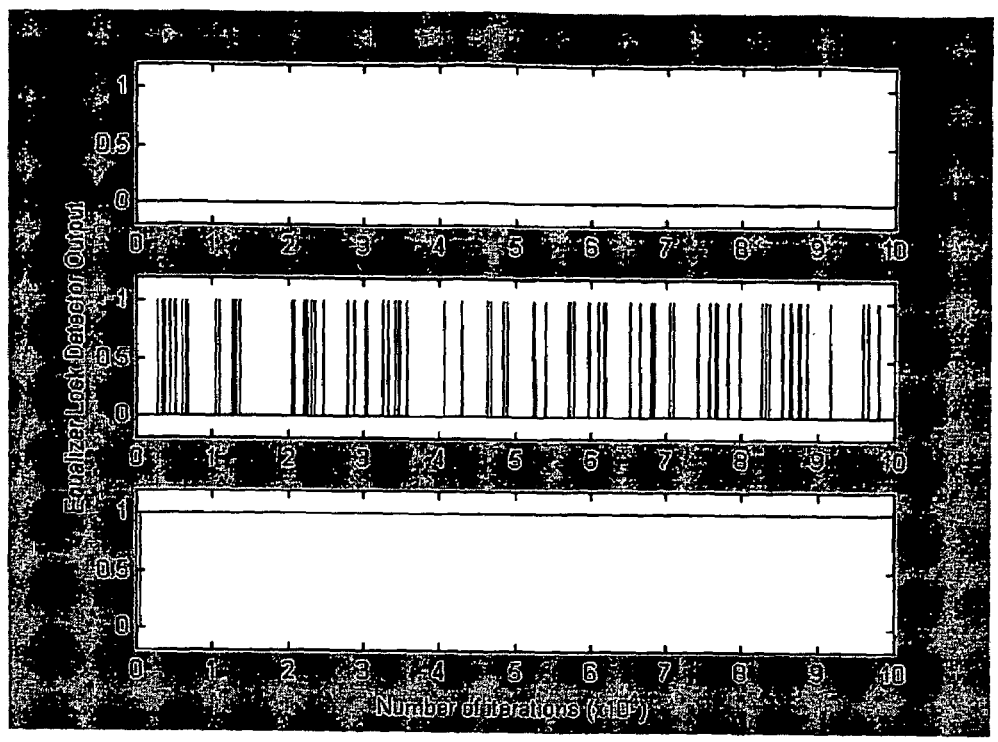
FIG. 3 shows equalizer lock detector output in the AWGN channel and automatic switching mode for different values of SNR.

It is helpful to a better understanding of the relationship between blind and dd mode in automatic switching mode to consider FIG. 3, which shows curves of the equalizer lock detector in the AWGN channel for different SNR values. The SNR is 13 dB in the top graph of FIG. 3, 15 dB in the center, and 18 dB in the bottom graph. In FIG. 3, a 0 level on the ordinate scale indicates that the equalizer is not locked, that is, it is in blind mode. When the equalizer is locked, the lock detector output assumes the value of 1, that is, the equalizer is in dd mode. We observe that for low SNR, the equalizer is mainly in blind mode, that is, convergence is never detected due to the high level of noise. This is an imperfection of the lock detector that cannot practically be overcome. For high SNR, the convergence is eventually detected, and the equalizer is transitioned to dd mode. At a medium SNR, there is constant switching of the lock detector, with noise affecting its ability to detect equalizer convergence besides potentially affecting the equalizer convergence. Similar behavior can be expected for the equalizer in soft automatic switching mode.

Figure 4:
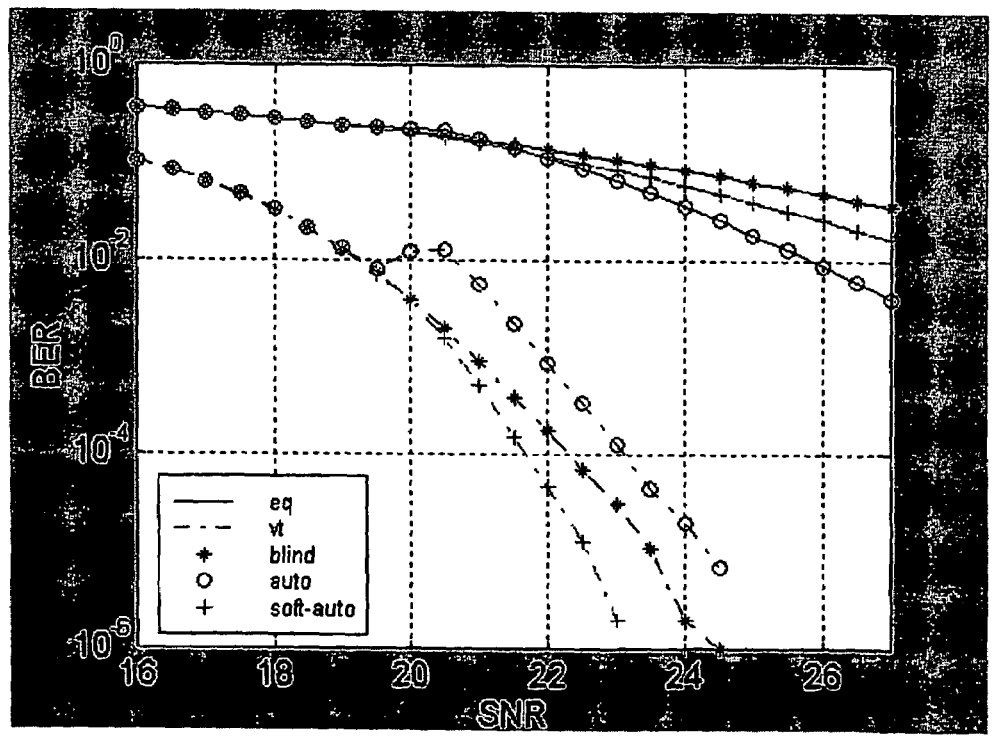
FIG. 4 shows bit error rate (BER) versus signal to noise ratio (SNR) in dB for an equalizer and Viterbi decoder under a 3 dB, 3 microsecond (µs) ghost signal and additive white Gaussian noise (AWGN)

If a multipath signal is now introduced in the channel, some differences in the system simulation may be observed. FIG. 4 shows BER vs. SNR performance curves for the HDTV receiver in the AWGN plus multipath channel. The multipath channel comprises one 3 dB, 3 μsec ghost, which is a relatively strong ghost. As in FIG. 2, the performance is measured after the equalizer as well as after the Viterbi decoder (VD). Also, three curves are shown for the equalizer as well as for the VD output: one for the equalizer in blind mode only, another for the equalizer in automatic switching mode and the third one for the equalizer in soft automatic switching mode.

In soft automatic switching mode, the equalizer is in blind mode prior to convergence, and switches to soft dd mode after convergence is detected. If convergence is lost, it switches back to blind mode. In soft dd mode, as opposed to the conventional dd mode, the input to the feedback filter is the output of the equalizer.

In view of the characteristics shown in FIG. 4, the following are herein recognized:
  a. Under automatic switching mode the equalizer output performance is equal to or better than in blind mode and in soft automatic switching mode. For increasing SNR, the automatic switching performance is increasingly better.
  b. However, the VD output performance does not reflect the equalizer output performance, especially for medium SNR. For those values of SNR, the VD output performance is worse under automatic switching mode rather than in blind mode and soft automatic switching mode by up to about 1.5 dB.
  c. While it is not apparent from FIG. 4, additional simulations show that for higher SNR values, the VD performance under automatic switching mode will again be better or equal than under blind mode and soft automatic switching mode.
  d. Additional simulations also show that the problem described in item b above becomes more evident for strong ghosts, although still present at a smaller scale for weaker ghosts.

It is helpful to an understanding of the difference in performance behavior between the equalizer and Viterbi decoder when the equalizer is under blind or automatic switching mode, to compute the number of error bursts at the equalizer output under these two modes.

Figure 5:
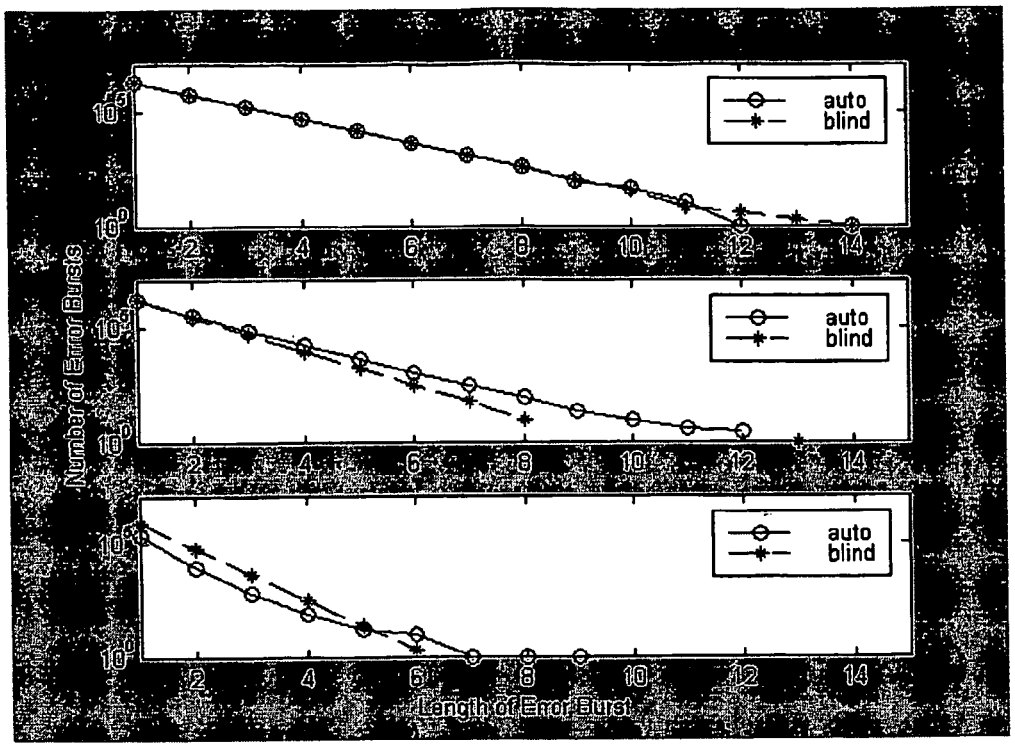
FIG. 5 shows the number of burst errors versus burst size at the equalizer output for blind and automatic switching mode and different SNR measures.

FIG. 5 shows plots for the number of bursts of errors versus the length of the burst under both equalizer modes, and for different SNR measures. The SNR is 18 dB in the top graph of FIG. 5, 21 dB in the center, and 25 dB in the bottom graph. In view of the characteristics shown in FIG. 5, the following are herein recognized:
  a. Under low SNR conditions, the number of errors is very similar for both blind and automatic switching mode. Long error bursts are present in both modes, with a slightly greater number for blind mode;
  b. Under medium SNR conditions, the number of error bursts and error burst length are clearly greater for automatic switching mode as compared with blind mode, as the number of long error bursts under blind mode decreases and automatic switching mode is not affected as much by the increase in SNR; and
  c. Under high SNR conditions the number of error bursts and error burst length become greater for blind mode as compared with automatic switching mode, as the number of long error bursts under automatic switching mode now decreases at a faster rate with increasing SNR.

Figure 6:
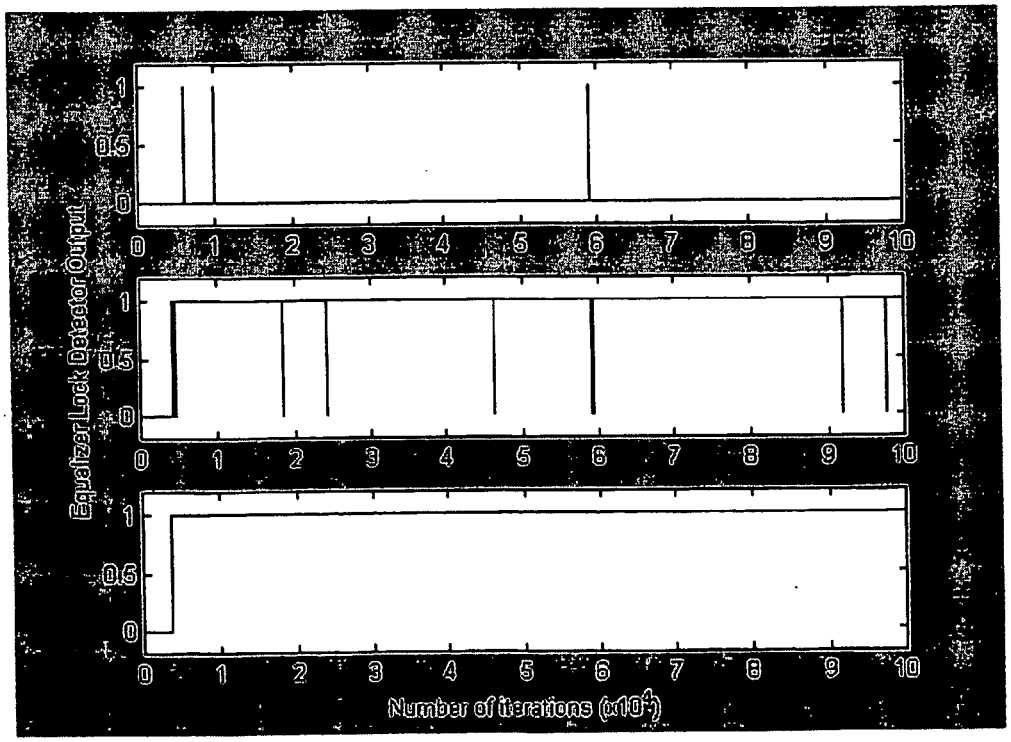
FIG. 6 shows an equalizer lock detector output in the −3 dB, 3 µs plus AWGN channel for different values of SNR.

FIG. 6 shows the equalizer lock detector output against the number of iterations ($\times 10^4$). The SNR is 18 dB in the top graph of FIG. 6, 21 dB in the center, and 25 dB in the bottom graph. The notion of low, medium or high SNR is actually dependent on the ghost profile and strength, since different ghosts imply different performance. However, as shown in FIG. 6, there is a relation between the SNR and the equalizer lock detector performance. As was the case in the AWGN channel, it is observed that for low SNR, the equalizer is mainly in blind mode, that is, convergence is never detected due to the high level of noise. For high SNR, the convergence is eventually detected, and the equalizer is transitioned to dd mode, remaining stable in that mode. At medium SNR, there is constant switching of the lock detector, as the level of noise does not allow for a stable dd mode. Similar behavior can be expected for the equalizer in soft automatic switching mode.

Based on the foregoing considerations and information presented, it is a feature of the present invention to detect these conditions of error propagation for which the standard dd mode delivers a worse performance than the soft dd mode, and to switch the modes.

Ideally, the equalizer lock detector would detect convergence regardless of the SNR. However, it is impracticable to implement an algorithm that is sufficiently immune to poor SNR. Furthermore, in a multipath environment, noise also affects the ability of the equalizer to converge and track and therefore, regardless of the ghost profile or SNR, it is desirable to detect unstable lock detector conditions.

Figure 7:
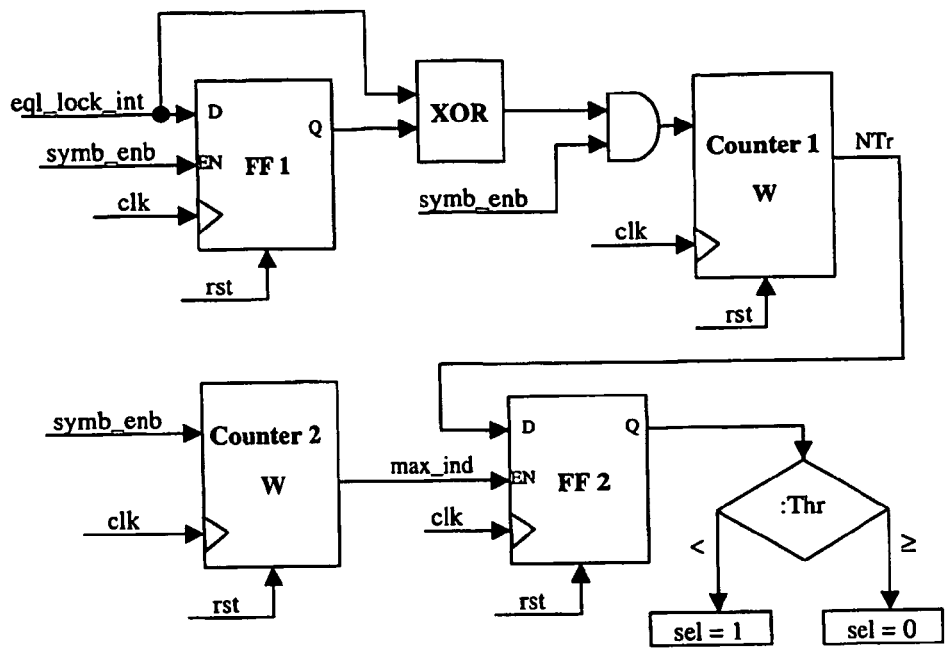
FIG. 7 shows an embodiment of an equalizer mode switch in block diagram form, in accordance with the present invention.
Figure 8:
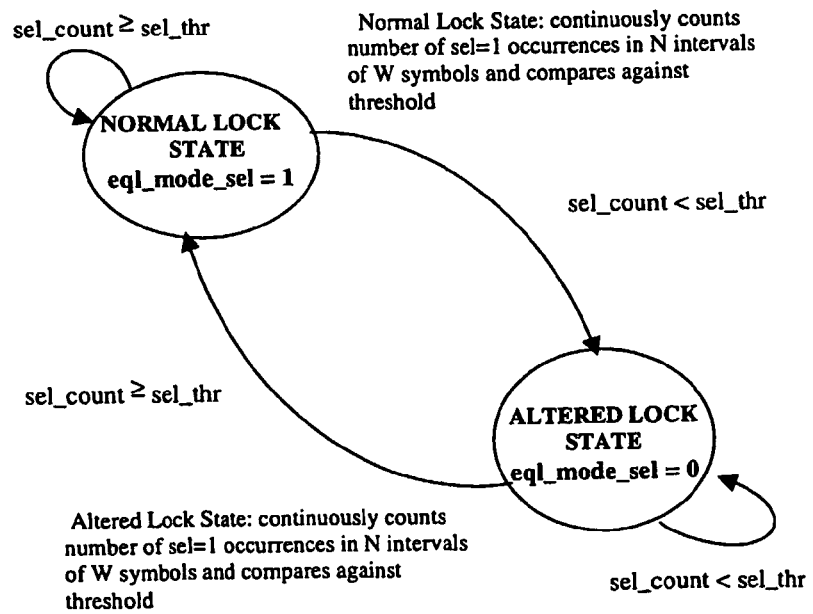
FIG. 8 shows an equalizer mode switch state machine chart in accordance with an aspect of the present invention.

FIGS. 7 and 8 show exemplary embodiments of an equalizer mode switch in accordance with the present invention. The invention proceeds to identify unstable conditions of the lock detector and uses this information in deciding upon the appropriate equalizer mode. The principle as applied in the present invention is that of threshold comparison. The remaining operations of the mode switch regarding the input to the FBF, error and control signal generation for the adaptation remain as explained in Section 1.

In FIG. 7, the lock detector transitions are counted during a certain window period of W symbol time periods and the number of transitions, NTr, is compared against a threshold, Thr. The system is initialized after each window period W and starts counting again. The window period, W, and the threshold, Thr, are programmable variables whose values can be identified after proper system testing. The two flip-flops, FF1 and FF2, are D-flip-flops with enable. The input eql_lock_int, which corresponds to the equalizer lock detector output, is delayed by FF1 and exclusive-or'ed, with its delayed version. This operation identifies transitions in the lock detector.

Counter 1 has a clock enable input and outputs the number of transitions NTr counted within a window of W counts. Counter 2 is a wrap around symbol counter with a window of W counts, which outputs a maximum count indicator, max_ind. This signal max_ind is 'high' or '1' when Counter 2 has reached its limit of W symbol count, and otherwise, it is 'low' or '0'. When max_ind=1, FF2 will store the value NTr. This value is then compared against the threshold count, Thr. If NTr≧Thr, there are too many lock detector transitions and the signal sel is set to '0'. If NTr<Thr, the number of transitions is considered reasonable, and sel is set to 1.

It will be understood that the circuit described in FIG. 7 is used as an exemplary embodiment of this invention and that other similar circuits may provide the same functionality of detecting the lock detection instability.

In FIG. 7, the signal sel gives an indication of whether the system should be set in soft automatic switching mode (sel=0) or should be kept in automatic switching mode (sel=1), which is the standard equalizer mode switch. In automatic switching mode, the equalizer is set to blind mode at startup; it switches to dd mode after equalizer convergence is detected and switches back to blind mode if convergence is lost. The indicator of equalizer convergence is the signal eql_lock_int, the equalizer lock detector output. In soft automatic switching mode, the dd mode is replaced by a soft dd mode, otherwise being similar to the automatic switching mode.

FIG. 8 contains a state machine representation for an embodiment of the present invention that utilizes the signal sel as an input, and introduces a further level of hysteresis. It counts within a window of size N periods of W symbols, the number of periods when sel remained at 0 or 1, depending on the current state being the normal lock or the altered lock state, respectively. At reset, the state machine is at normal lock state, and the equalizer mode switch is 1, that is, the automatic switching mode is chosen. The state machine continuously checks on the signal set and counts occurrences of sel=1 with variable sel_count. If sel_count is less than the established threshold sel_thr, then the state machine transitions to the altered lock state. Once in the altered lock state, the equalizer mode switch is set to 0, meaning soft automatic switching mode. Similarly, the state machine continuously checks on the signal sel, and counts occurrences of sel=1 with variable sel_count. If sel_count is greater than or equal to the established threshold, sel_thr, then the state machine transitions to the normal lock state.

It will be understood that the diagram described in FIG. 8 is used as an exemplary embodiment of this invention and that other similar state machines may provide the same functionality of added hysteresis to the signal sel.

While the invention has been described and explained by way of an equalizer mode switch designed for the HDTV-ATSC equalizer, its principles can be applied to any general equalizer with a DFE architecture, in a system where the equalizer is followed by a trellis or convolutional decoder. For such a system, the error propagation into the DFE filter originated by linear distortion, noise and the slicer presence in dd mode results in bursty type of noise at the equalizer output, which will tend to impair the decoder performance. It will be understood that the various functions of the invention may be carried out by software in a programmed computer application or may be implemented in the form of hard circuits, integrated or otherwise or by a combination of both. In addition, although described in the context of a symbol-spaced (T-spaced, where T is the symbol period) equalizer, the invention can also be applied to fractionally spaced equalizers. Fractionally spaced equalizers are described in several textbooks, such as the afore-mentioned "Digital Communications", by John G. Proakis, $2^{nd}$ edition, McGraw-Hill, New York, 1989. Also, the soft decision directed input to the FBF, although described as the equalizer output, could be a more complex soft decision function of the equalizer output. It should be also understood that the equalizer in FIG. 1 could include the training mode as well. The training mode of operation would be exclusive with respect to the blind mode as in a traditional DFE and would not interfere with the decision directed modes.

While the present invention has been described by way of exemplary embodiments, it will be recognized and understood by one of skill in the art to which the invention pertains that various changes and substitutions may be made without departing from the invention as defined by the claims following.

What is claimed is:

1. Apparatus for automatically selecting one of a standard decision directed (dd) mode and a soft dd mode in a decision feedback equalizer (DFE) for receiving a data signal, said apparatus comprising:

an equalizer having an output for providing a DFE output signal and having a control input for receiving data responsive to a first control signal exhibiting (a) a first value for selecting said standard dd mode and (b) a second value for selecting said soft dd mode;

said equalizer including a lock detector having an output for providing a lock signal indicative of equalizer convergence; and a mode selector having an input coupled to said lock detector output and having an output coupled to said control input for providing said data responsive to the first control signal exhibiting one of said first and second values depending upon characteristics of said lock signal.

2. Apparatus in accordance with claim 1, wherein said mode selector includes:
a processor having:
an input coupled to said mode selector input for counting the number of transitions of said lock signal between said first and second values during a defined interval;
a comparator for comparing said number of transitions against a defined threshold count; and
a comparator output providing the first control signal exhibiting said first value when said number of transitions is less than said threshold count and exhibiting said second value when said number of transitions is not less than said threshold count, said comparator output being coupled to said mode selector output.

3. Apparatus in accordance with claim 2, wherein said defined interval corresponds to a period of a defined number of symbol time periods of said data signal.

4. Apparatus in accordance with claim 3, wherein said defined interval and said defined threshold count are programmable variables.

5. Apparatus in accordance with claim 4, wherein said processor includes:
a transition detector including a first D-flip-flop for outputting a delayed version of said lock signal;
an exclusive-OR gate coupled to said lock signal and to said delayed version for providing a transition-indicating signal, said transition-indicating signal exhibiting a count of NTr for said defined counting interval;
the count comparator for comparing said count of NTr against said threshold count for providing said first control signal.

6. Apparatus in accordance with claim 1, wherein said mode selector includes a second output for selectively placing said DFE output in one of:
(a) one of a standard dd mode and a soft dd mode, and
(b) a blind mode, depending upon characteristics of said lock signal.

7. Apparatus in accordance with claim 6, wherein
said second mode selector output selectively places said DFE output in blind mode when said lock signal output indicates no convergence, and
places said DFE output in one of said dd modes when said lock signal output detects one of convergence or unstable convergence, with a decision as to which dd mode is selected being controlled by said first mode selector output.

8. Apparatus in accordance with claim 1, wherein said mode selector includes a second output for selectively placing said DFE output in one of:
(a) one of a standard dd mode and a soft dd mode, and
(b) a training mode, depending upon characteristics of said lock signal.

9. Apparatus in accordance with claim 5, wherein
said second mode selector output selectively places said DFE output in training mode when said lock signal output indicates no convergence, and
places said DFE output in one of said dd modes when said lock signal output detects one of convergence or unstable convergence, with a decision as to which dd mode is selected being controlled by said first mode selector output.

10. Apparatus in accordance with claim 9, wherein said comparator output is coupled to said mode selector output by way of a state machine including:
apparatus for counting, during a period of a given number of symbol periods of said data signal, the number of occurrences of said first value of said first control signal for providing a second control signal, wherein:
(a) if said equalizer is in a first mode and said number of occurrences of said first value is not less than a given threshold count, said second signal exhibits said first value, and
(b) if said equalizer is in a second mode and said number of occurrences of said first value is less than said given threshold count, said second signal exhibits said second value.

11. Apparatus in accordance with claim 10, wherein said given number of symbol periods and said threshold count are programmable variables.

12. Apparatus for automatic selection of one of a standard automatic switching mode and a soft automatic switching mode in a decision feedback equalizer for receiving a data signal, said equalizer including a lock detector for providing a lock signal indicative of equalizer convergence, and wherein said selection is based on monitoring of the rate of transitions of said lock signal.

13. Apparatus in accordance with claim 12, wherein said selection is based on whether said rate of transitions is less than or not less than a prescribed rate.

14. Apparatus in accordance with claim 13, wherein:
when said rate of transitions is less than said prescribed rate, said standard automatic switching mode is selected; and
when said rate of transitions is not less than said prescribed rate, said soft automatic switching mode is selected.

15. Apparatus in accordance with claim 13, wherein said prescribed rate is defined as a threshold count of transitions within a window period.

16. Apparatus in accordance with claim 15, wherein said window period is defined in terms of symbol counts of said data signal.

17. Apparatus in accordance with claim 16, wherein said window period and said threshold count are programmable variables.

18. Apparatus in accordance with claim 12, wherein said selection is further based on:
taking account of which mode is presently selected; and
the rate of lock signal occurrences for setting said standard automatic switching mode as compared with a given threshold occurrence rate.

19. Apparatus in accordance with claim 18, wherein:
when said standard decision directed (dd) mode is presently selected and said rate of lock signal occurrences for setting said standard dd mode is less than said given threshold occurrence rate, said soft dd mode is selected;
otherwise, when said rate of lock signal occurrences is not less than said given threshold occurrence rate, said standard dd mode remains selected;
when said soft dd mode is presently selected and said rate of lock signal occurrences for setting said standard dd mode is not less than said given threshold occurrence rate, said standard dd mode is selected; and
otherwise, when said rate of lock signal occurrences is less than said given threshold occurrence rate, said soft dd mode remains selected.

20. Apparatus in accordance with claim 18, wherein said given threshold occurrence rate is defined in terms of a threshold number of said lock signal occurrences within a period of a defined number N of symbol counts W of said data signal.

21. Apparatus for automatic selection of one of a standard automatic switching mode and a soft automatic switching mode in a decision feedback equalizer (DFE) for receiving a data signal, wherein said automatic switching mode comprises one of:
  (a) a blind mode, and
  (b) a decision directed mode, and
said soft automatic switching mode comprises one of:
  (a) a blind mode, and
  (b) a soft decision directed mode;
said equalizer having a control input for receiving data based on mode selection responsive to a signal exhibiting:
  (a) a first value for selecting said standard automatic switching mode, and
  (b) a second value for selecting said soft automatic switching mode, and including a lock detector for providing a lock signal having first and second lock signal values respectively indicative of equalizer convergence and non-convergence; and
apparatus for providing a selection signal for mode selection, said apparatus:
  monitoring the rate of transitions of said lock signal between said first and second lock signal values and providing a control signal;
  comparing said rate of transitions with a threshold rate of transitions and causing said control signal to exhibit a first control value when said rate of transitions is less than said threshold rate and to exhibit said second value when said rate of transitions is not less than said threshold rate;
  when said equalizer is in said standard automatic switching mode, monitoring the rate of occurrences of said control signal having said first control value and comparing said rate with a threshold rate of occurrence and if said rate of occurrences is less than said threshold rate of occurrence then causing said selection signal to exhibit said second value for selecting said soft automatic switching mode;
  otherwise, when said rate of occurrences is not less than said threshold rate of occurrence, said standard automatic switching mode remains selected, and
  when said equalizer is in said soft automatic switching mode, monitoring the rate of occurrences of said control signal having said first control value and comparing said rate with said threshold rate of occurrence and if said rate of occurrences is not less than said threshold rate of occurrence then causing said selection signal to exhibit said first value for selecting said standard automatic switching mode, and
  otherwise, when said rate of occurrences is less than said threshold rate, said soft automatic switching mode remains selected.

22. Apparatus for automatic selection of one of a standard automatic switching mode and a soft automatic switching mode in a decision feedback equalizer for a data signal, wherein said automatic switching mode comprises a blind or decision directed mode and said soft automatic switching mode comprises a blind or soft decision directed mode, said apparatus comprising:
  means for monitoring transitions of a lock signal indicative of equalizer convergence;
  means for comparing the rate of said transitions against a prescribed rate;
  means for providing a control signal exhibiting:
    a first control value associated with said standard automatic switching mode when said rate of transitions is less than said prescribed rate and exhibiting a second control value associated with said soft automatic switching mode when said rate of transitions is not less than said prescribed rate; and
  means for counting, during a period of a given number of symbol periods of said data signal, the number of occurrences of said first control value of said control signal and if:
  said equalizer is in a first mode and said number of occurrences of said first control value is less than a given threshold count, said means selects said soft automatic switching mode, otherwise, said means selects said standard automatic switching mode, and if:
  said equalizer is in said second mode and said number of occurrences of said first level value is not less than said given threshold count, said means selects said standard automatic switching mode, otherwise, said means selects said soft automatic switching mode.

23. Apparatus for automatic selection of one of a standard automatic switching mode and a soft automatic switching mode in a decision feedback equalizer (DFE) for a data signal, wherein said automatic switching mode comprises a blind or decision directed mode and said soft automatic switching mode comprises a blind or soft decision directed mode, and the apparatus comprising:
  means for monitoring transitions of a lock signal indicative of equalizer convergence;
  means for comparing the rate of said transitions against a prescribed rate;
  means (state machine) for providing a selection signal exhibiting a first value for selecting said standard automatic switching mode when said rate of transitions is less than said prescribed rate and exhibiting a second value for selecting said soft automatic switching mode when said rate of transitions is not less than said prescribed rate.

24. Apparatus for automatically selecting one of a standard decision directed (dd) mode and a soft dd mode in a decision feedback equalizer (DFE) for receiving a data signal, said apparatus comprising:
  means for determining the rate of transitions between first and second values of a lock signal indicative of convergence;
  means for comparing said rate of transitions against a defined threshold rate; and
  means for providing a first control signal exhibiting a first value when said rate of transitions is less than said threshold count and exhibiting a second value when said rate of transitions is not less than said threshold count; and
  means for selecting a mode based on said first control signal, said first standard dd mode being selected when the first control signal exhibits a first value and said soft dd mode being selected when the first control signal exhibits a second value.

25. Apparatus in accordance with claim 24, wherein said means for selecting a mode based on said first control signal comprises:
  means for determining the rate of occurrences of said first value of said first control signal (state machine) for providing a second control signal;
  means for comparing said rate of occurrences of said first value of said first control signal to a given rate of occurrence;

means for causing said second control signal to exhibit a first given value if said equalizer is in said first mode and said rate of occurrences of said first value of said first control signal is not less than a given threshold count, otherwise, the second control signal exhibits a second given value;

means for causing said second control signal to exhibit said second given value if said equalizer is in said second mode and said rate of occurrences of said first level is not less than said given threshold count, otherwise, the second control signal exhibits said first given value; and means for selecting said mode based on said second control signal.

26. A method for automatic selection of one of a standard automatic switching mode and a soft automatic switching mode in a decision feedback equalizer for receiving a data signal, comprising the steps of:

monitoring transitions of lock signal indicative of equalizer convergence;

comparing the rate of said transitions against a prescribed rate;

providing a selection signal exhibiting a first value for selecting said standard automatic switching mode when said rate of transitions is less than said prescribed rate and exhibiting a second value for selecting said soft automatic switching mode when said rate of transitions is not less than said prescribed rate.

27. A method for automatic selection of one of a standard automatic switching mode and a soft automatic switching mode in a decision feedback equalizer for receiving a data signal, comprising the steps of:

monitoring transitions of a lock signal indicative of equalizer convergence;

comparing the rate of said transitions against a prescribed rate;

providing a selection signal exhibiting a first value when said rate of transitions is less than said prescribed rate and exhibiting a second value when said rate of transitions is not less than said prescribed rate;

counting, during a period of a given number of symbol periods of said data signal, the number of occurrences of said first value of said first signal;

if said equalizer is in said first mode and said number of occurrences of said first value is not less than a given threshold count, selecting said standard automatic switching mode, otherwise, selecting soft automatic switching mode; and if said equalizer is in said second mode and said number of occurrences of said first value is not less than said given threshold count, selecting said standard automatic switching mode, otherwise, selecting soft automatic switching mode.

28. A method for automatically selecting one of a standard automatic switching mode and a soft automatic switching mode in a decision feedback equalizer (DFE) for receiving a data signal, comprising the steps of:

determining the rate of transitions between first and second values of a lock signal indicative of convergence;

comparing said rate of transitions against a defined threshold rate;

providing a first signal exhibiting a first given value when said number of transitions is less than said threshold count and exhibiting a second given value when said number of transitions is not less than said threshold count; and selecting a mode based on said first signal, said first standard automatic switching mode being selected when said first signal exhibits said first given value and said soft automatic switching mode being selected when said first signal exhibits said second given value.

29. A method in accordance with claim 28, wherein said step of selecting said mode based on said first signal comprises the steps of:

determining the rate of occurrences of said first given value of said first signal;

comparing said rate of occurrences of said first given value of said first signal against a threshold;

if said equalizer is in said first mode and said number of occurrences of said first given value is not less than a given threshold count, causing a second signal to exhibit said first given value, otherwise, said second signal exhibits said second given value;

if said equalizer is in said second mode and said number of occurrences of said first given value is not less than said given threshold count, causing said second signal to exhibit said first given value, otherwise, said second signal exhibits said second given value; and selecting said mode based on said second signal.

* * * * *